(12) United States Patent
Sugiyama

(10) Patent No.: US 7,667,814 B2
(45) Date of Patent: Feb. 23, 2010

(54) MONOCHROMATIC LIQUID CRYSTAL DISPLAY WITH HIGH CONTRAST

(75) Inventor: Takashi Sugiyama, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 71 days.

(21) Appl. No.: 12/127,202

(22) Filed: May 27, 2008

(65) Prior Publication Data

US 2008/0304001 A1 Dec. 11, 2008

(30) Foreign Application Priority Data

Jun. 8, 2007 (JP) ............................. 2007-152982

(51) Int. Cl.
*C09K 19/02* (2006.01)
(52) U.S. Cl. ..................................... 349/180
(58) Field of Classification Search .................. 349/180
See application file for complete search history.

(56) References Cited

FOREIGN PATENT DOCUMENTS

JP 2004-062021 A 2/2004

*Primary Examiner*—Frank G Font
*Assistant Examiner*—Erin D Chiem
(74) *Attorney, Agent, or Firm*—Frishauf, Holtz, Goodman & Chick, P.C.

(57) ABSTRACT

An STN liquid crystal display cell includes a liquid crystal layer sandwiched between a first and second transparent substrate, is outwardly provided with a first and second polarizers, and a monochromatic back light. Twist angle of the liquid crystal layer is 95° to 170° or 200° to 280°; a first angle between alignment direction of liquid crystal molecules contacting the first transparent substrate and polarization direction of the first polarizer and a second angle between an alignment direction of liquid crystal molecules contacting the second transparent substrate and polarization direction of the second polarizer are each larger than 0° and smaller than 90°; and sum of the first and second angles is 90°±7°.

7 Claims, 11 Drawing Sheets

| | TW (°) | a (°) | b (°) | a+b (°) | λ (nm) | Toff (%) | Ton (%) | R (μm) |
|---|---|---|---|---|---|---|---|---|
| E1 | 270 | 60 | 30 | 90 | 630 | 0 | 38 | 0.847 |
| E2 | 270 | 45 | 45 | 90 | 630 | 0 | 42 | 0.847 |
| E3 | 150 | 70 | 20 | 90 | 630 | 0 | 33 | 0.625 |
| E4 | 150 | 60 | 30 | 90 | 630 | 0 | 33 | 0.713 |
| E5 | 270 | 60 | 30 | 90 | 550 | 0 | 38 | 0.724 |
| COM | 270 | 30 | 30 | 60 | | 6 | 50 | 0.952 |

R=0.847 μm

S5

R=0.724 μm

MONOCHROMATIC LIQUID CRYSTAL DISPLAY WITH HIGH CONTRAST

CROSS REFERENCE TO RELATED APPLICATION

This application is based on and claims priority of Japanese Patent Application No. 2007-152982 filed on Jun. 8, 2007, the entire contents of which are incorporated herein by reference.

BACKGROUND OF THE INVENTION

A) Field of the Invention

The present invention relates to a liquid crystal display, and more particularly to a liquid crystal display capable of providing a high contrast ratio by using a monochromatic light source.

B) Description of the Related Art

A super-twisted nematic (STN) liquid crystal display (LCD) has been used as a liquid crystal display device of a high duty ratio. One type of STN-LCD is a blue color mode display device. A so-called blue color display, in which blue color is presented when a voltage is not applied and white color is presented when a voltage is applied can be made by disposing a polarizing axis of an analyzer at 30 degrees in a counter-clockwise direction relative to long axes of liquid crystal molecules on light emitting (optical output) side and by disposing a polarizing axis of a polarizer at 30 degrees in a clockwise direction relative to long axes of liquid crystal molecules on light incident (optical input) side.

JP-A-2004-62021 proposes to improve light shielding performance in a cut-off state by mixing dichromatic pigment in liquid crystal composition of STN-LCD of the blue color mode. A compensation plate or plates may be used as another means for improving light shielding performance.

The blue color mode generally uses a white color back light. If a monochromatic light source such as a light emitting diode (LED) is used, it is possible to provide a normally black mode in which a back light color becomes a display color in black background, in which a transmission factor is lowered in the absence of applied voltage, and is increased to a level suitable for display in the presence of applied voltage at an emission wavelength of the back light.

SUMMARY OF THE INVENTION

STN-LCD has a transmission spectrum having a minimum value at a certain wavelength. In the mode of monochromatic display in a normally black background it is desired to increase a contract ratio of transmission in the presence of applied voltage to transmission in the absence of applied voltage.

An object of this invention is to provide an STN liquid crystal display device capable of improving a contrast ratio in a normally black mode.

According to one aspect of the present invention, there is provided an STN liquid crystal display comprising: a back light using a monochromatic light source for emitting monochromatic light; and a liquid crystal display cell including opposing first and second transparent substrates, first and second transparent electrodes formed on opposing surfaces of the first and second substrates, respectively, first and second alignment films formed above the first and second transparent substrates, respectively, and covering the first and second transparent electrodes, a liquid crystal layer containing chiral agent squeezed between the first and second transparent substrates, and first and second polarizers disposed on outer surfaces of the first and second transparent substrates, wherein: a twist angle of the liquid crystal layer is 95° to 170° or 200° to 280°; a first angle between an alignment direction of liquid crystal molecules in the liquid crystal layer contacting the first transparent substrate and a polarization direction of the first polarizer and a second angle between an alignment direction of liquid crystal molecules in the liquid crystal layer contacting the second transparent substrate and a polarization direction of the second polarizer are each larger than 0° and smaller than 90°; and a sum of the first and second angles is 90°±7°.

It is possible to provide STN-LCD having a high contrast ratio and monochromatic display color in a normally black mode.

DESCRIPTION OF THE PREFERRED EMBODIMENTS

Figure 1A:
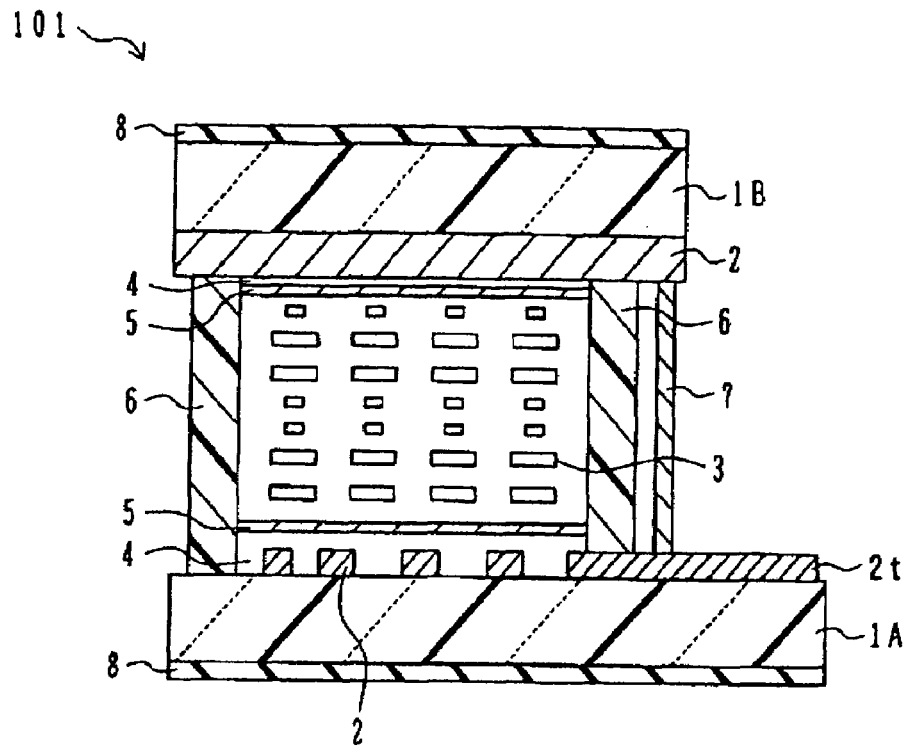
FIGS. 1A and 1B are a schematic cross sectional view of a liquid crystal display and a table showing an outline of various parameters and optical transmission factors in the absence of applied voltage and in the presence of applied voltage, respectively of Examples 1 to 5 and a comparative example.

FIG. 1A is a cross sectional view of a liquid crystal display 101.

A transparent ITO film is formed on each of two glass substrates 1A and 1B by CVD, vapor deposition, sputtering or the like, ad desired ITO electrode patterns 2 and external lead wirings 2t are formed by photolithography and etching. An insulating film 4 is formed on each of the glass substrates, covering the ITO electrode patterns 2 and 2t by flexographic printing. Although this insulating film 4 is not essential, it is desired to prevent a short circuit between the upper and lower substrates. The insulating film may be formed by vapor deposition, sputtering or the like using a metal mask in addition to flexographic printing.

An alignment film 5 having the same pattern as that of the insulating film 4 is formed on each of the insulating films 4 by flexographic printing.

A rubbing process is executed for the alignment film 5. The rubbing process is a process of rubbing the alignment film 5 by rotating a tubular roll wound with a cloth at high speed.

A seal member 6 having a predetermined pattern is formed on one substrate by screen printing. The seal member may be formed by using a dispenser, instead of screen printing. In this example, thermosetting seal material (product name ES-7500 manufactured by MIHSUI CHEMICALS, INC) is used. Photosetting seal material or photo-thermo setting seal material may also be used. The seal member 6 contains several % of glass fibers of 6 μm in diameter.

A conductive member 7 is printed outside the seal member 6 at a predetermined position. In this example, the conductive member 7 made of the seal material ES-7500 containing several % of Au balls of 6.5 μm in diameter is formed by screen printing.

The seal member pattern 6 and conductive member pattern 7 are formed above one of the substrates, e.g., the upper substrate 1B, and a gap control member is sprayed on the other substrate, e.g., the lower substrate 1A by a dry spray method. The gap control member is made of plastic balls of 6 μm in diameter.

The two substrates 1A and 1B are stacked at the predetermined position, with the alignment films 5 being set inside, to form a cell, and in a pressed state the seal member 6 is cured by heat treatment. Although a single liquid crystal cell is shown in FIG. 1A, a plurality of liquid crystal cells may be formed with a pair of substrates.

If a plurality of liquid crystal cells are formed with a pair of substrates, flaws are formed on the glass substrates with a scriber apparatus, and the substrates are divided into empty cells having a predetermined size and shape, by breaking.

Liquid crystal 3 containing chiral agent is injected into an empty cell by a vacuum injection method, and thereafter an injection port is sealed with an end seal material. Thereafter, the glass substrates are chamfered and washed to form a liquid crystal cell.

A pair of polarizers 8 are adhered to the top and bottom surfaces of the liquid crystal cell 8 to complete a liquid crystal display 101.

Description will be made on STN-LCD of the blue color mode as a comparative example.

Figure 2A:
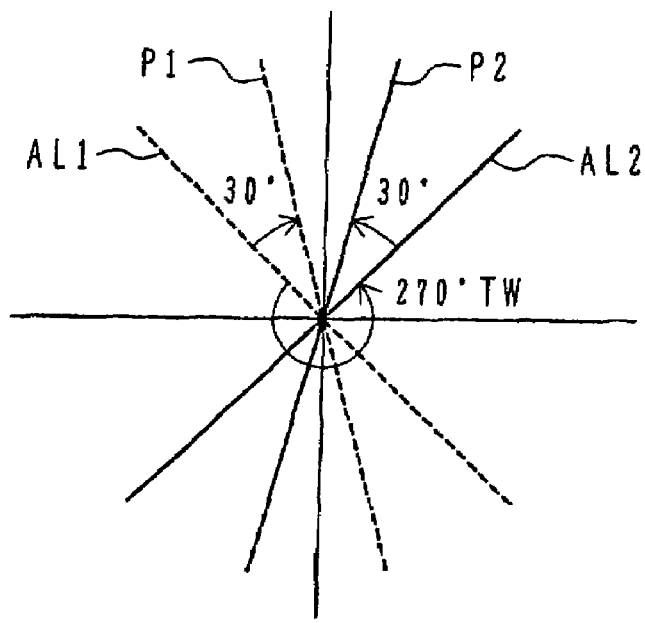
FIG. 2A is a diagram showing relation among alignment directions of liquid crystal molecules and polarization directions of the polarizers of a blue color mode STN-LCD of a comparative example.

FIG. 2A is a diagram showing relation among alignment directions AL of liquid crystal molecules and polarization directions P of the polarizers of a blue color mode STN-LCD. A horizontal direction and a vertical direction correspond to a horizontal direction and a vertical direction in a standard state of observing a liquid crystal display. As shown, a twist angle TW of liquid crystal is 270° A smaller angle a of two angles between an alignment direction AL1 of liquid crystal molecules contacting an upper substrate (front substrate) and a polarization direction P1 of an upper polarizer is 30°, and a smaller angle b of two angles between an alignment direction AL2 of liquid crystal molecules contacting a lower substrate (back substrate) and a polarization direction P2 of a lower polarizer is also 30°. The directions P1 and AL1 are mirror symmetric to the directions P2 and AL2 with respect to the vertical axis.

Figure 2B:
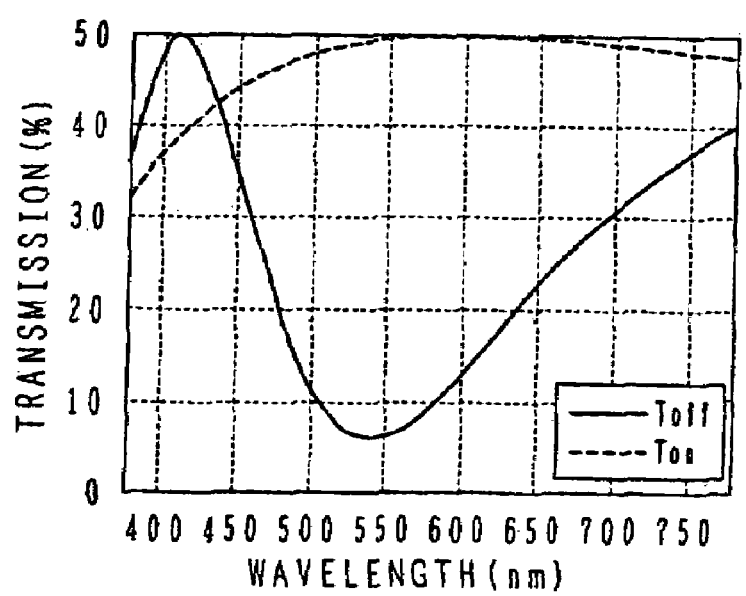
FIG. 2B is a graph showing an optical transmission spectrum of the liquid crystal display device shown in FIG. 2A in a wavelength range including the visible range.

FIG. 2B is a graph showing a transmission spectrum of the STN liquid crystal display device shown in FIG. 2A in a wavelength range including the visible range. The transmission spectrum was calculated by simulation software formed by the present inventor. As shown, a transmission spectrum in the absence of applied voltage has a maximum value and a minimum value in the visible range. The maximum value is at a wavelength of blue color, and is about 50%. A background color of the liquid crystal display in the absence of applied voltage becomes blue. A transmission factor in the presence of applied voltage is about 50% almost in the whole visible range. Although the transmission factor in the blue color range is slightly lower than that in the other visible range, light from a white color back light is transmitted to present white color display. Display is therefore performed in white and blue colors.

A minimum value of the transmission in the absence of applied voltage is about 6% at a wavelength of 540 in. Since the transmission is not 0% even at the minimum value, optical through or leak light occurs in the absence of applied voltage. In the display with a monochromatic light source, a transmission in the presence of applied voltage is about 48% and a transmission in the absence of applied voltage is about 6%, respectively, at a wavelength of 540 nm at which a ratio of transmission in the presence of applied voltage to transmission in the absence of applied voltage is highest. Therefore, a contrast ratio is about 8 at a maximum, and it is difficult to obtain a high contrast ratio.

The present inventor has paid attention to the minimum value of a transmission factor in the absence of applied voltage. If a minimum value of a transmission factor in the absence of applied voltage can be set as near at 0% as possible when using, as a back light, a light source which emits monochromatic light having a wavelength at the minimum value, the monochromatic light is shielded in the absence of applied voltage, and transmitted in the presence of applied voltage. It is therefore possible to manufacture a liquid crystal display of a normally black display having a high contrast ratio.

Through studies of various layouts of polarizers, the present inventor has found that excellent characteristics can be exhibited in the layout having an angle of 90° as a sum of an angle (smaller angle) between alignment direction of liquid crystal molecules contacting the upper substrate of a liquid crystal display and polarization direction of the polarizer in proximity to the upper substrate, and an angle between alignment direction of liquid crystal molecules contacting the lower substrate and polarization direction of the polarizer in proximity to the lower substrate. It has been found that if this condition is satisfied, there exists a wavelength at which a transmission factor is nearly 0% in the transmission-wavelength characteristics in the absence of applied voltage.

Description will be made hereunder on examples assuming a combination with a red back light having a wavelength of 630 nm or a green back light having a wavelength of 550 nm, respectively as a center of emission wavelengths. A retardation of a cell is selected in such a manner that a wavelength at which transmission factor becomes 0% or a minimum value sufficiently small enough to realize normally black display coincides with the emission wavelength of a back light. The retardation of a cell can be adjusted by changing a cell thickness or birefringence. The birefringence can be adjusted as desired by changing liquid crystal material or mixing liquid crystal materials having different characteristics, in the range normally used as the material of a liquid crystal display.

Example 1

Figure 3A:
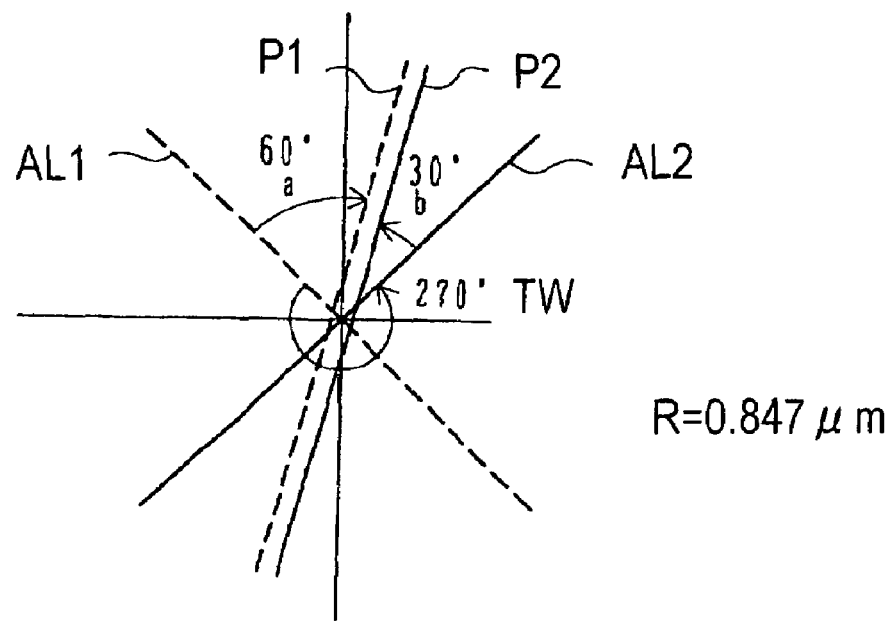
FIG. 3A is a diagram showing relation among alignment directions of liquid crystal molecules and polarization directions of the polarizers of STN-LCD of Example 1.

FIG. 3A is a diagram showing relation among alignment directions of liquid crystal molecules and polarization directions of the polarizers of an STN-LCD of Example 1. As shown, a twist angle TW of liquid crystal is 270° A smaller angle a of two angles between the in-plane alignment direction AL1 of liquid crystal molecules contacting the upper substrate and the polarization direction P1 of the upper polarizer is 60°, and a smaller angle b of two angles between the in-plane alignment direction AL2 of liquid crystal molecules contacting the lower substrate and the polarization direction P2 of the lower polarizer is 30°. The polarization direction of a polarizer is expressed by an absolute angle, neglecting difference between clockwise direction and counter-clockwise direction. Retardation R of the liquid crystal cell of Example 1 is 0.847 μm.

Figure 3B:
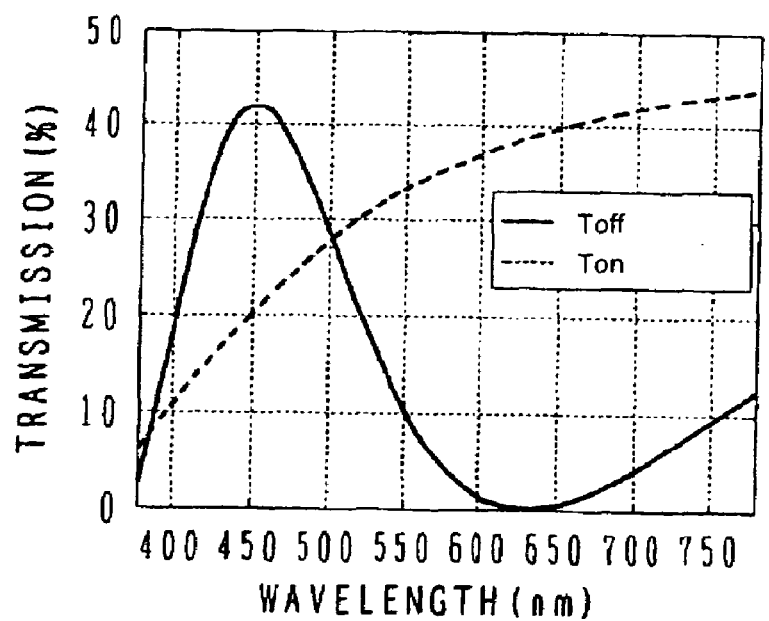
FIG. 3B is a graph showing an optical transmission spectrum of the liquid crystal display device shown in FIG. 3A in a wavelength range including the visible range.

FIG. 3B is a graph showing transmission spectra of the liquid crystal display shown in FIG. 3A in a wavelength range including the visible range. As shown, transmission spectrum Toff in the absence of applied voltage has a minimum value of 0% at a wavelength of 630 nm. By using an LED at this wavelength as a back light, light of the back light can be shielded in the absence of applied voltage so that normally black can be realized. Transmission spectrum Ton in the presence of applied voltage is about 38% at a wavelength of 630 nm so that bright display can be realized at a high contrast ratio.

Example 2

Figure 4A:
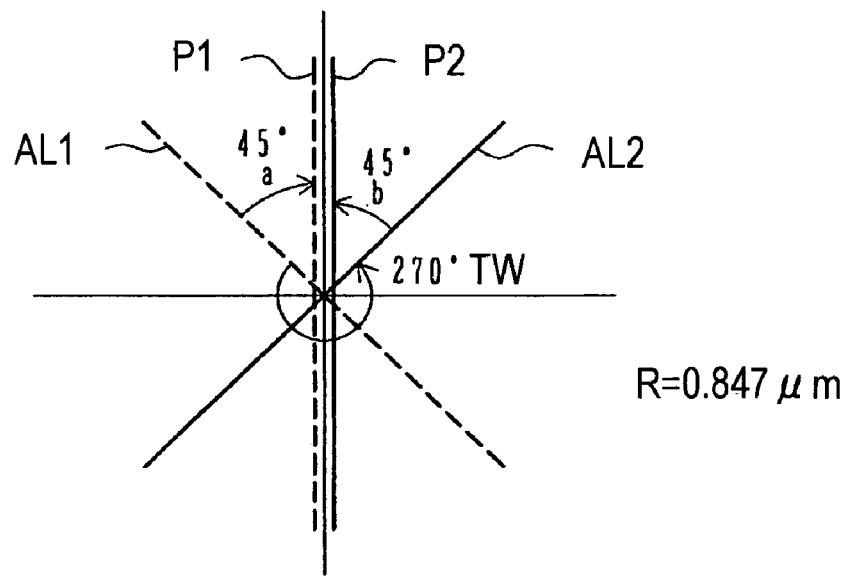
FIG. 4A is a diagram showing relation among alignment directions of liquid crystal molecules and polarization directions of the polarizers of STN-LCD of Example 2.

FIG. 4A is a diagram showing relation among alignment directions of liquid crystal molecules and polarization directions of the polarizers of an STN-LCD of Example 2. As shown, a twist angle TW of liquid crystal is 270° A smaller angle a of two angles between the in-plane alignment direction AL1 of liquid crystal molecules contacting the upper substrate and the polarization direction P1 of the upper polarizer is 45°, and a smaller angle b of two angles between the in-plane alignment direction AL2 of liquid crystal molecules contacting the lower substrate and the polarization direction P2 of the lower polarizer is 45°. Retardation R of the liquid crystal cell of Example 2 is 0.847 μm.

Figure 4B:
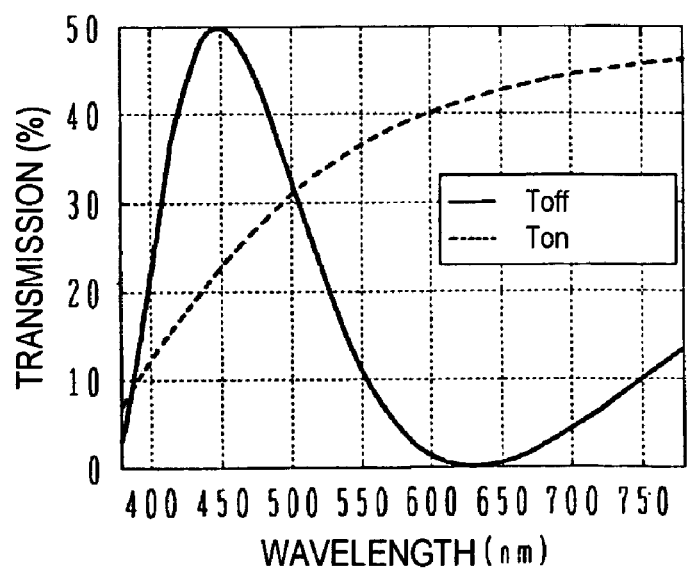
FIG. 4B is a graph showing an optical transmission spectrum of the liquid crystal display device shown in FIG. 4A in a wavelength range including the visible range.

FIG. 4B is a graph showing transmission spectra of the liquid crystal display shown in FIG. 4A in a wavelength range including the visible range. As shown, transmission spectrum Toff in the absence of applied voltage has a minimum value of 0% at a wavelength of 630 nm. By using an LED at this wavelength as a back light, light of the back light can be shielded in the absence of applied voltage so that normally black can be realized. Transmission factor Ton in the presence of applied voltage is about 42% at the wavelength of 630 nm so that bright display can be realized at a high contrast ratio.

Comparative Example

Figure 5A:
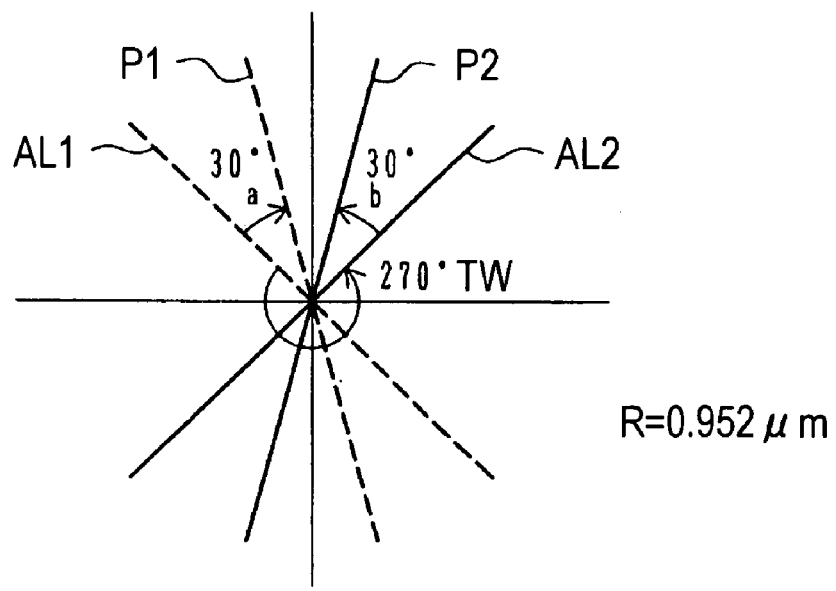
FIG. 5A is a diagram showing relation among alignment directions of liquid crystal molecules and polarization directions of the polarizers of STN-LCD of Example 3.

FIG. 5A is a diagram showing relation among alignment directions of liquid crystal molecules and polarization directions of the polarizers of an STN-LCD of a comparative example. As shown, twist angle TW of liquid crystal is 270° A smaller angle a of two angles between the in-plane alignment direction AL1 of liquid crystal molecules contacting the upper substrate and the polarization direction P1 of the upper polarizer is 30°, and a smaller angle b of two angles between the in-plane alignment direction AL2 of liquid crystal molecules contacting the lower substrate and the polarization direction P2 of the lower polarizer is 30°. Retardation R of the liquid crystal cell of the comparative example is 0.952 μm.

Figure 5B:
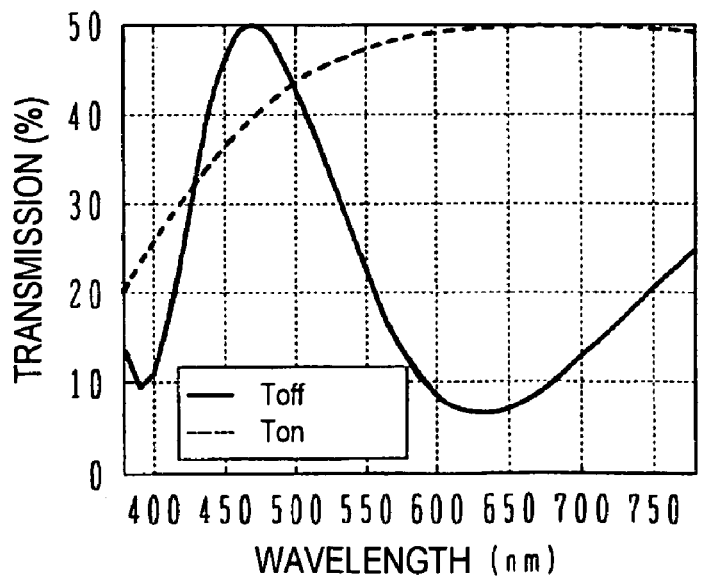
FIG. 5B is a graph showing an optical transmission spectrum of the liquid crystal display device shown in FIG. 5A in a wavelength range including the visible range.

FIG. 5B is a graph showing transmission spectra of the liquid crystal display shown in FIG. 5A in a wavelength range including the visible range. As shown, transmission spectrum Toff in the absence of applied voltage has a minimum value of about 6% at a wavelength of 630 nm. Even if an LED at this wavelength is used as a back light, light of the back light is partially transmitted in the absence of applied voltage so that normally black is hardly realized. Transmission spectrum Ton in the presence of applied voltage is about 50% at a wavelength of 630 nm, and contrast ratio is about 8.

Example 3

Figure 6A:
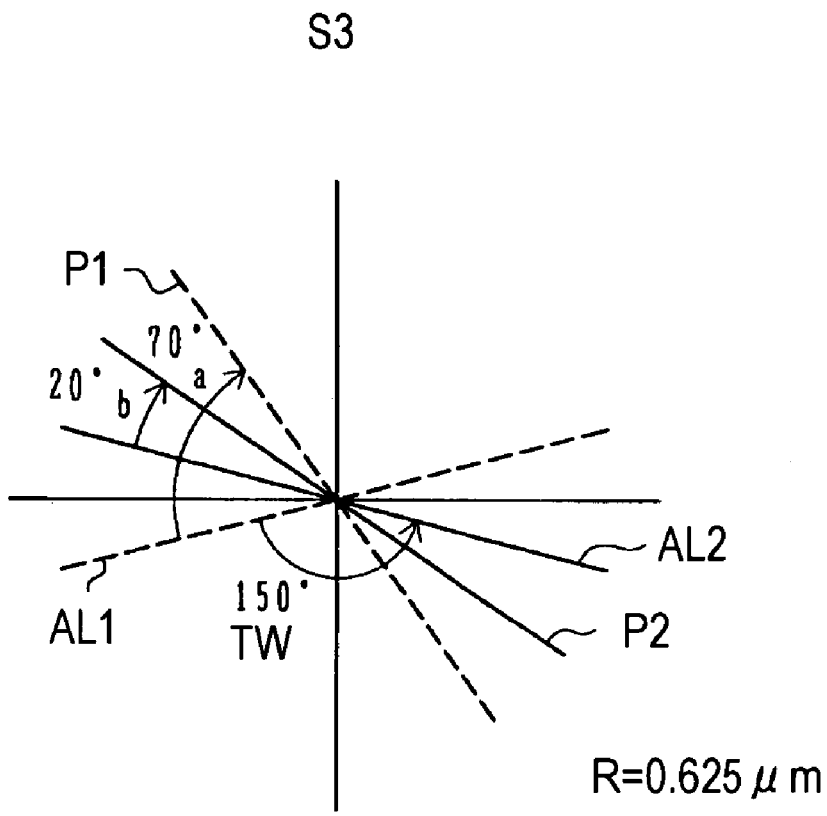
FIG. 6A is a diagram showing relation among alignment directions of liquid crystal molecules and polarization directions of the polarizers of STN-LCD of Example 4.

FIG. 6A is a diagram showing relation among alignment directions of liquid crystal molecules and polarization directions of the polarizers of an STN-LCD of Example 3. As shown, twist angle TW of liquid crystal is 150° A smaller angle a of two angles between the in-plane alignment direction AL1 of liquid crystal molecules contacting the upper substrate and the polarization direction P1 of the upper polarizer is 70°, and a smaller angle b of two angles between the in-plane alignment direction AL2 of liquid crystal molecules contacting the lower substrate and the polarization direction P2 of the lower polarizer is 20°. Retardation R of the liquid crystal cell of Example 3 is 0.625 μm.

Figure 6B:
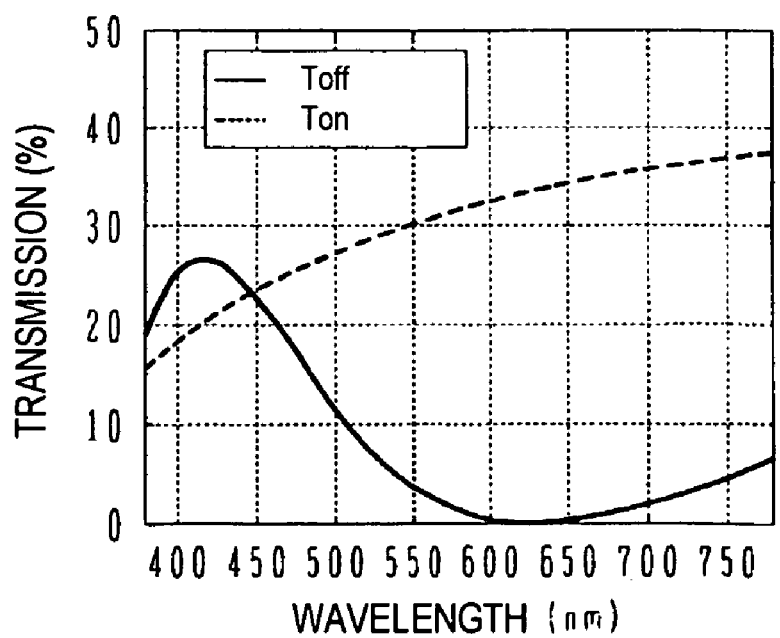
FIG. 6B is a graph showing an optical transmission spectrum of the liquid crystal display device shown in FIG. 6A in a wavelength range including the visible range.

FIG. 6B is a graph showing transmission spectra of the liquid crystal display shown in FIG. 6A in a wavelength range including the visible range. As shown, transmission spectrum Toff in the absence of applied voltage has a minimum value of 0% at a wavelength of 630 nm. By using an LED at this wavelength as a back light, light of the back light can be shielded in the absence of applied voltage so that normally black can be realized. Transmission spectrum Ton in the presence of applied voltage is about 33% at the wavelength of 630 nm so that bright display can be realized at a high contrast ratio.

Example 4

Figure 7A:
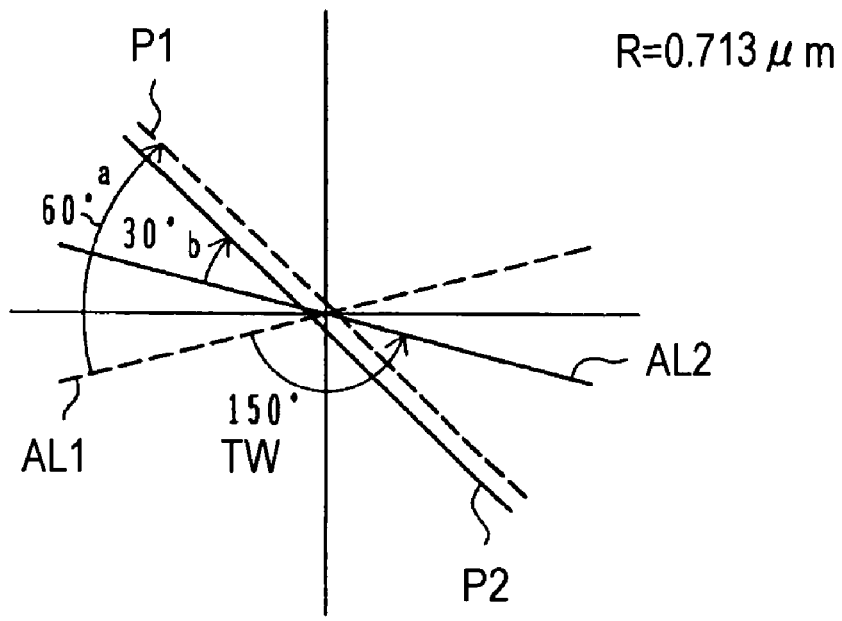
FIG. 7A is a diagram showing relation among alignment directions of liquid crystal molecules and polarization directions of the polarizers of STN-LCD of Example 4.

FIG. 7A is a diagram showing relation among alignment directions of liquid crystal molecules and polarization directions of the polarizers of an STN-LCD of Example 4. As shown, twist angle TW of liquid crystal is 150° A smaller angle a of two angles between the in-plane alignment direction AL1 of liquid crystal molecules contacting the upper substrate and the polarization direction P1 of the upper polarizer is 60°, and a smaller angle b of two angles between the in-plane alignment direction AL2 of liquid crystal molecules contacting the lower substrate and the polarization direction P2 of the lower polarizer is 30. Retardation R of the liquid crystal cell of Example 4 is 0.713 µm.

Figure 7B:
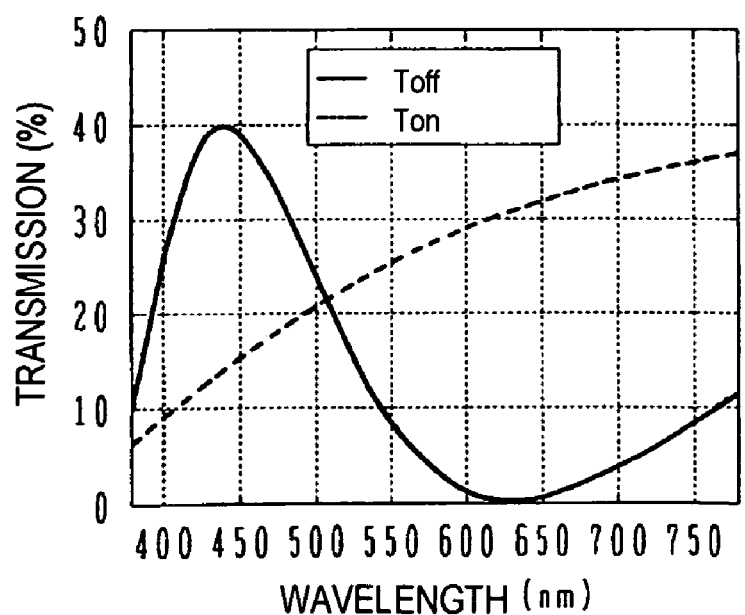
FIG. 7B is a graph showing an optical transmission spectrum of the liquid crystal display device shown in FIG. 7A in a wavelength range including the visible range.

FIG. 7B is a graph showing transmission spectra of the liquid crystal display shown in FIG. 7A in a wavelength range including the visible range. As shown, transmission spectrum Toff in the absence of applied voltage has a minimum value of 0% at a wavelength of 630 nm. By using an LED at this wavelength as a back light, light of the back light can be shielded in the absence of applied voltage so that normally black call be realized. Transmission spectrum Ton in the presence of applied voltage is about 33% at the wavelength of 630 nm so that bright display can be realized at a high contrast ratio.

Example 5

Figure 8A:
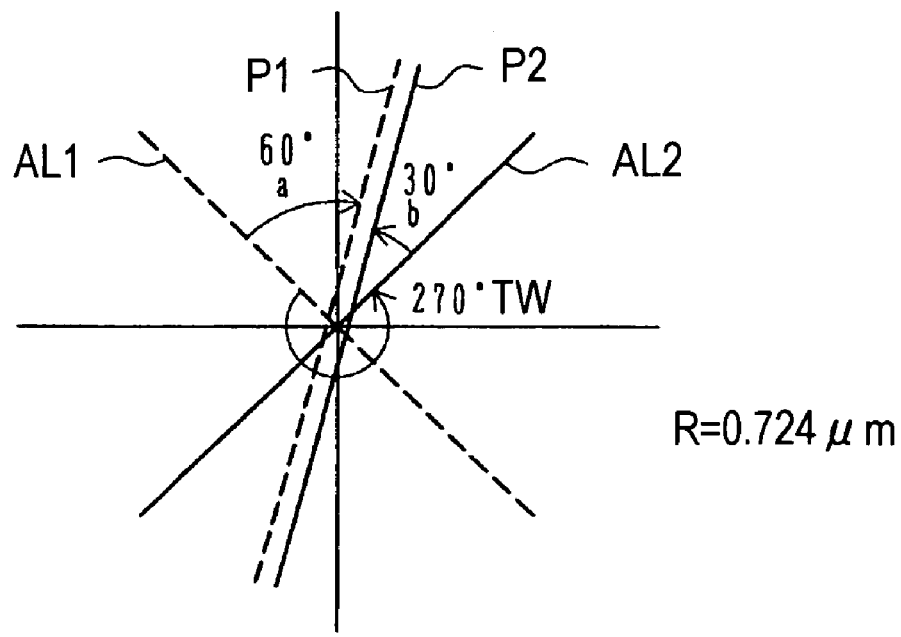
FIG. 8A is a diagram showing relation among alignment directions of liquid crystal molecules and polarization directions of the polarizers of STN-LCD of Example 5.

FIG. 8A is a diagram showing relation among alignment directions of liquid crystal molecules and polarization directions of the polarizers of an STN-LCD of Example 5. As shown, twist angle TW of liquid crystal is 270° A smaller angle a of two angles between the in-plane alignment direction AL1 of liquid crystal molecules contacting the upper substrate and the polarization direction P1 of the upper polarizer is 60°, and a smaller angle b of two angles between the in-plane alignment direction AL2 of liquid crystal molecules contacting the lower substrate and the polarization direction P2 of the lower polarizer is 30°. Retardation R of the liquid crystal cell of Example 5 is 0.724 µm.

Figure 8B:
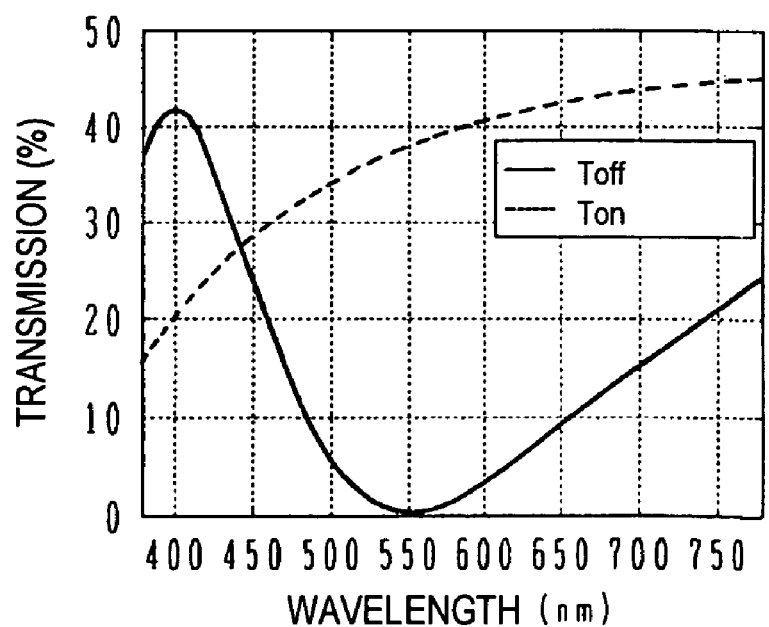
FIG. 8B is a graph showing an optical transmission spectrum of the liquid crystal display device shown in FIG. 8A in a wavelength range including the visible range.

FIG. 8B is a graph showing transmission spectra of the liquid crystal display shown in FIG. 8A in a wavelength range including the visible range. As shown, transmission spectrum Toff in the absence of applied voltage has a minimum value of 0% at a wavelength of 550 nm. By using an LED (green) at this wavelength as a back light, light of the back light can be shielded in the absence of applied voltage so that normally black can be realized. Transmission spectrum Ton in the presence of applied voltage is about 33% at the wavelength of 550 nm so that bright display can be realized at a high contrast ratio.

Figure 1B:
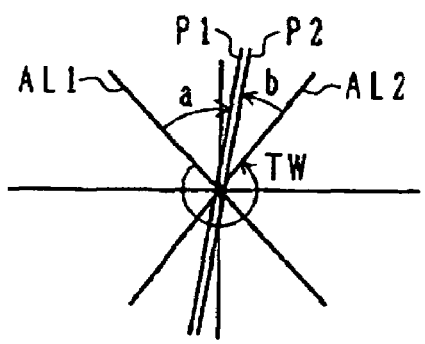

FIG. 1B is a table showing outline of various parameters and transmission factors Toff in the absence of applied voltage and transmission factors Ton in the presence of applied voltage, respectively of Examples and the comparative example. E1 to E5 stand for Examples 1 to 5, and COM stands for Comparative example. In Examples 1 to 5, sum (i+b) of the angles a and b is 90°. Toff=0 and Ton>30% so that bright display can be realized at a high contrast ratio.

Various Examples have been described above. Even if sum of the angles a and b is 90°, it is not suitable for general applications if transmission factor in the presence of applied voltage is low and display is dark.

Figure 9:
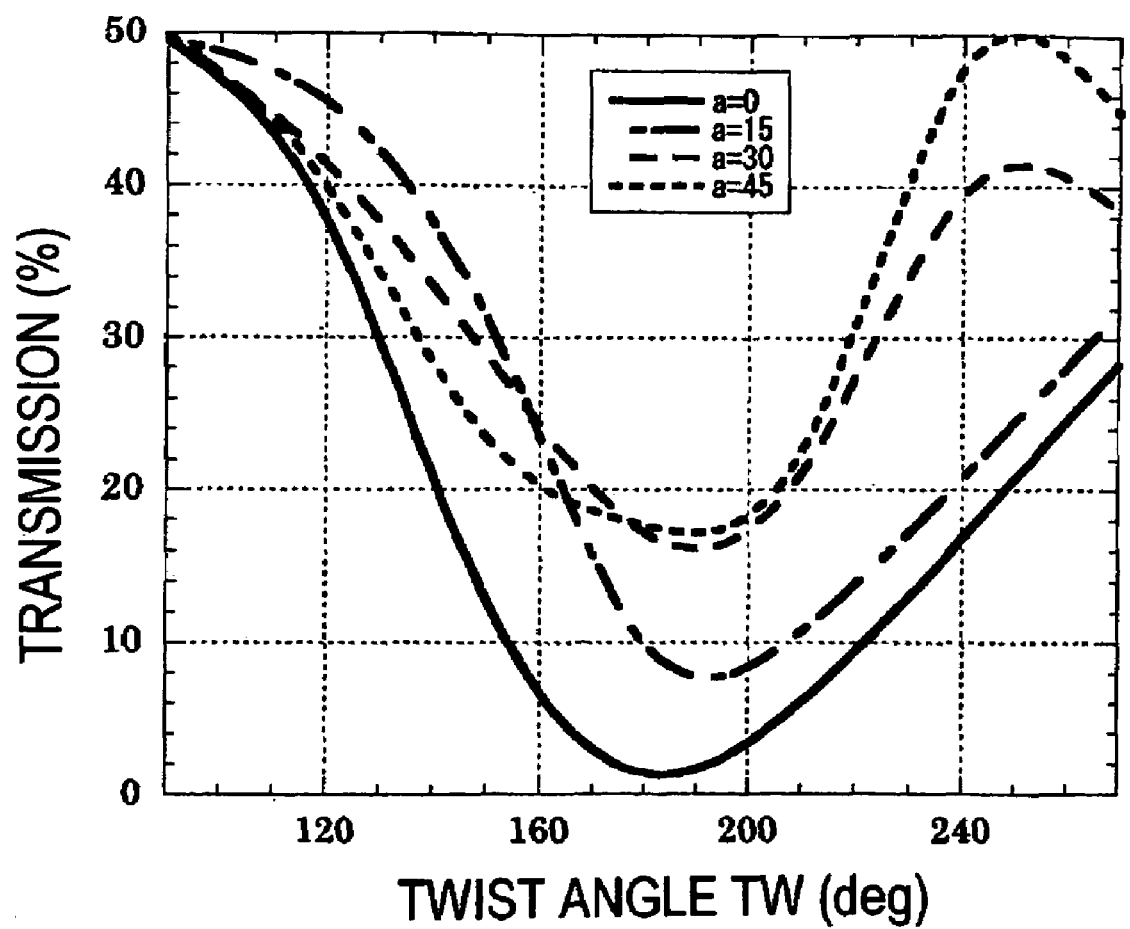
FIG. 9 is a graph showing the relation between a twist angle and an optical transmission factor at a wavelength of 630 nm in the presence of applied voltage, using an angle a as a parameter.

FIG. 9 shows the characteristics of optical transmission factor r relative to twist angle TW at a wavelength of 630 nm in the presence of applied voltage, using the angle a as a parameter, provided that a+b=90°. The characteristics are shown when angle a is 0°, 15°, 30° and 45°. The characteristics were calculated by a simulator. The characteristics at an angle a of 60° are the same as those at 30° and the characteristics at an angle a of 75° are the same as those at 15°.

As shown, the characteristics of the transmission factor F relative to the twist angle TW have respectively a minimum value near at the twist angle of 180° to 190°. This angle range is not suitable for realizing bright display.

There is a tendency that as the angle a becomes smaller (as the angle b approaches 90° correspondingly), the transmission factor T becomes lower. This tendency is distinctive particularly for larger twist angle TW. The characteristics at the angle a of 0° have the lowest transmission factor in the whole twist angle range. In order to obtain bright display, the layout of the polarizer at the angle a of 0° (b 90°) is to be avoided as much as possible. That is, the alignment direction of liquid crystal molecules in contact with a substrate should not be parallel to the direction of the adjacent polarizer. The angle a (and b) is preferably not smaller than 5° (not larger than 85°) and more preferably not smaller than 10° (not larger than 80°). Assuming that a transmission factor not smaller than 18% is proper for products, it can be said that a preferable twist angle range is 95° to 170° or 200° to 280°.

Figure 10:
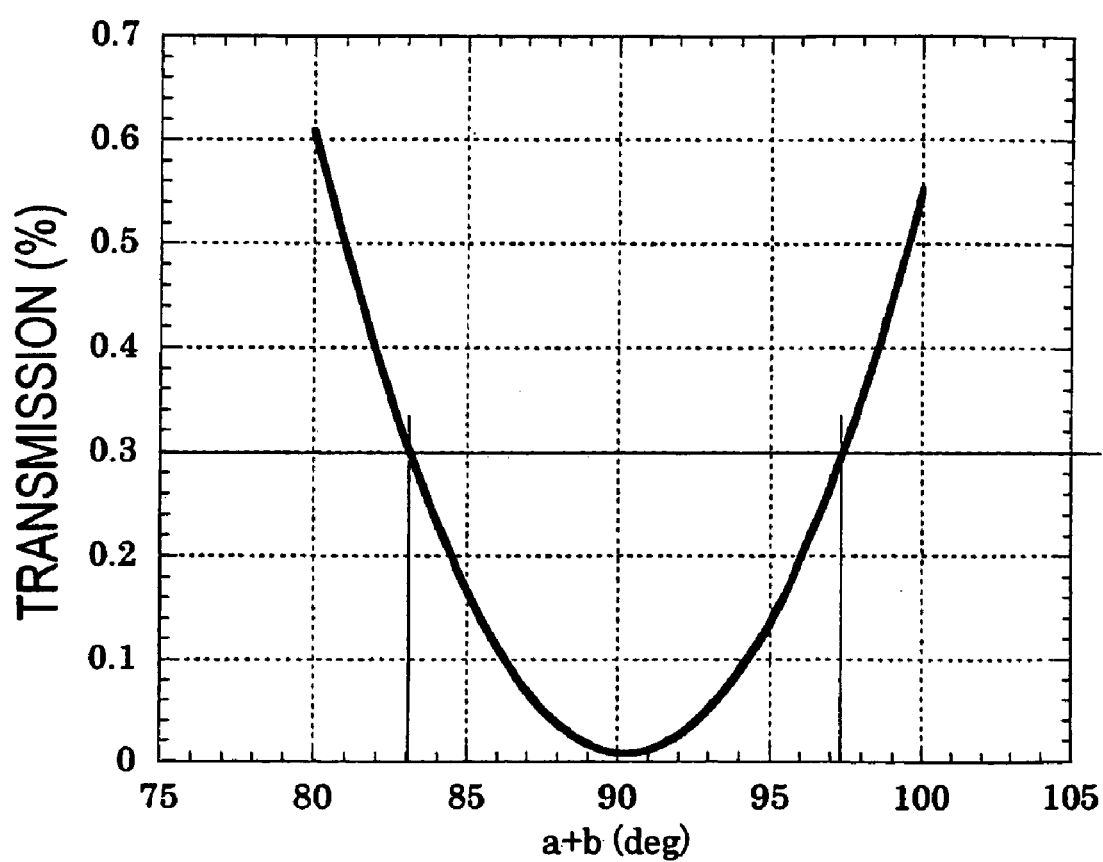
FIG. 10 is a graph showing the relation between a transmission factor of a liquid crystal display at a wavelength of 630 nm relative and an angle a+b.

FIG. 10 is a graph showing optical transmission factor of a liquid crystal display in the absence of applied voltage at a wavelength of 630 nm relative to the sum angle a+b. Samples having different polarization angles of polarizers were prepared and the display qualities were observed. It has been found that the optical transmission factor in the absence of applied voltage is preferably not larger than 0.3%. In order to satisfy this condition, it can be seen from this graph that it is sufficient if the sum angle a+b is within 90°±7°.

Figure 11:
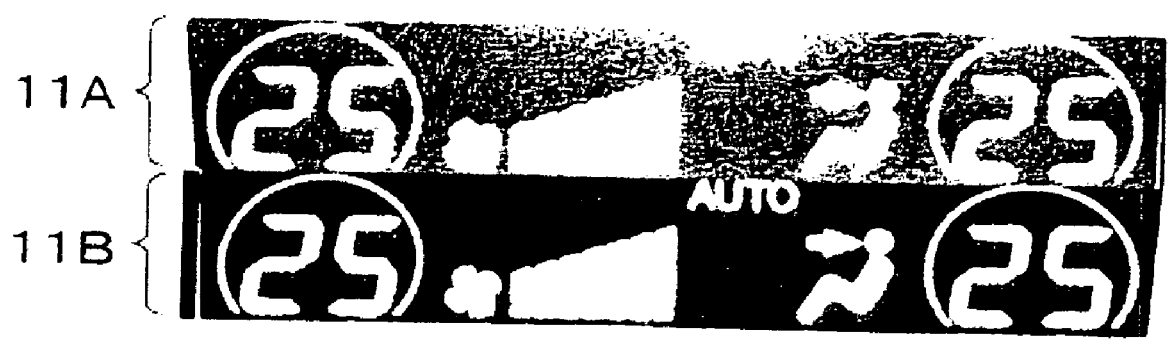
FIGS. 11A and 11B are photographs showing examples of a vehicle-mounted liquid crystal display.

FIGS. 11A and 11B show examples of a vehicle-mounted liquid crystal display. Many vehicle-mounted liquid crystal displays are of simple matrix type, segment type, and combined simple matrix-segment type. For example, red display of a normally black mode is used at the display of a vehicle-mounted air conditioner.

FIG. 11A shows a display example of a liquid crystal display applying the comparative example, and FIG. 11B shows a display example of a liquid crystal display applying Example 1. It can be seen that the display example applying Example 1 has a blacker background and a higher contrast ratio.

The present invention has been described in connection with the preferred embodiments. The invention is not limited only to the above embodiments. For example, as a light source of a single wavelength, a laser may be used instead of I-ED.

It will be apparent to those skilled in the art that other various substitutions, modifications, improvements, combinations, and the like can be made.

What are claimed are:

1. An STN liquid crystal display comprising.
a back light using a monochromatic light source for emitting monochromatic light; and
a liquid crystal display cell including first and second transparent substrates facing to each other, first and second transparent electrodes formed on facing surfaces of said first and second transparent substrates, respectively, first and second alignment films formed above said first and second transparent substrates, covering said first and second transparent electrodes, respectively, a liquid crystal layer sandwiched between said first and second transparent substrates, and first and second polarizers disposed on outer surfaces of said first and second transparent substrates,
wherein twist angle of said liquid crystal layer is 95° to 170° or 200° to 280°, a first angle between an alignment direction of liquid crystal molecules in said liquid crystal layer contacting said first transparent substrate and a polarization direction of said first polarizer and a second angle between an alignment direction of liquid crystal molecules in said liquid crystal layer contacting said second transparent substrate and a polarization direction of said second polarizer are each larger than 0° and smaller than 90°; and sum of said first and second angles is 90°±7°.

2. The STN liquid crystal display according to claim 1, wherein each of said first and second angles is in a range from 5° to 85°.

3. The STN liquid crystal display according to claim 2, wherein each of said first and second angles is in a range from 10° to 80°.

4. The STN liquid crystal display according to claim 1, wherein an optical transmission factor of said liquid crystal display cell in an absence of applied voltage has a minimum value at an emission light wavelength of said monochromatic light source.

5. The STN liquid crystal display according to claim 1, wherein emission light of said monochromatic light source is green light or red light.

6. The STN liquid crystal display according to claim 1, wherein the STN liquid crystal display is a vehicle-mounted display.

7. The STN liquid crystal display according to claim 1, wherein the STN liquid crystal layer contains chiral agent.

* * * * *